United States Patent
Takagi et al.

(10) Patent No.: US 6,956,720 B2
(45) Date of Patent: Oct. 18, 2005

(54) HEAD SUSPENSION FOR DISK DRIVE HAVING A RECESS BETWEEN A FLANGE CONTACT FACE AND A BOSS

(75) Inventors: Yasuji Takagi, Yokohama (JP); Takumi Karasawa, Yokohama (JP); Hidenori Ogawa, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 200 days.

(21) Appl. No.: 10/334,551

(22) Filed: Dec. 31, 2002

(65) Prior Publication Data

US 2003/0128473 A1 Jul. 10, 2003

(30) Foreign Application Priority Data

Jan. 7, 2002 (JP) ........................................ 2002-000420

(51) Int. Cl.⁷ .............................................. G11B 21/16
(52) U.S. Cl. .................................................. 360/244.6
(58) Field of Search .......................... 360/244.6, 244.5, 360/265.9

(56) References Cited

U.S. PATENT DOCUMENTS

| | | | |
|---|---|---|---|
| 4,167,765 A | | 9/1979 | Watrous .................... 360/245.3 |
| 5,262,911 A | * | 11/1993 | Cain et al. ................. 360/244.6 |
| 5,602,698 A | * | 2/1997 | Miyazaki et al. .......... 360/244.6 |
| 5,646,802 A | * | 7/1997 | Akiyama et al. .......... 360/244.6 |
| 5,689,389 A | * | 11/1997 | Braunheim ................ 360/244.6 |
| 5,717,545 A | * | 2/1998 | Brooks et al. ............. 360/244.6 |
| 5,870,254 A | * | 2/1999 | Baserman et al. ........ 360/244.6 |
| 5,963,383 A | * | 10/1999 | Jurgenson ................. 360/244.6 |
| 5,973,885 A | * | 10/1999 | Hanrahan et al. ......... 360/244.6 |
| 6,697,224 B2 | * | 2/2004 | Wang et al. ............... 360/244.6 |
| 6,697,227 B2 | * | 2/2004 | Kashima et al. .......... 360/245.2 |

FOREIGN PATENT DOCUMENTS

| | | |
|---|---|---|
| JP | 04-26459 | 3/1992 |
| JP | 04-238172 | 8/1992 |
| JP | 09-197329 | 7/1997 |
| JP | 11-77528 | 3/1999 |
| JP | 2000-162532 | 6/2000 |

* cited by examiner

Primary Examiner—Brian E. Miller
(74) Attorney, Agent, or Firm—Jordan and Hamburg LLP

(57) ABSTRACT

A head suspension for a disk drive has a load beam, a base plate, and a recess. The base plate has a thin flange and is capable of improving the attaching accuracy and strength of the head suspension to a carriage arm of the disk drive. The base plate has the flange and a boss. The flange has a contact face to be attached to a contact face of the carriage arm. The boss is inserted into a hole of the carriage arm and plastically deformed therein to fix the base plate to the carriage arm. The load beam has a rigid part and a resilient part and is supported by the base plate, to apply load on a slider arranged at a front end of the load beam. The recess is formed on the base plate along a corner between the flange and the boss, to secure a gap relative to the contact face of the carriage arm.

11 Claims, 7 Drawing Sheets

HEAD SUSPENSION FOR DISK DRIVE HAVING A RECESS BETWEEN A FLANGE CONTACT FACE AND A BOSS

BACKGROUND OF THE INVENTION

1. Field of the Invention

The present invention relates to a head suspension for a disk drive incorporated in an information processing apparatus such as a personal computer.

2. Description of the Related Art

A hard disk drive (HDD) records and reproduces information to and from rotating magnetic or magneto-optical disks. The HDD has a carriage turned around a spindle by a positioning motor.

An example of the carriage is disclosed in U.S. Pat. No. 4,167,765. The carriage of this disclosure includes carriage arms, a head suspension attached to a front end of each carriage arm, a head attached to the head suspension, and a slider attached to the head. When the disks are rotated at high speed, the sliders slightly float from the disks, and air bearings are formed between the disks and the sliders.

FIG. 13 shows an example of an HDD employing head suspensions according to a related art. The head suspension includes a load beam 101 made of, for example, a precision thin plate spring, a flexure 103 made of a very thin plate spring fixed to a front end of the load beam 101 by, for example, laser welding, and a base plate 105 fixed to a base part of the load beam 101 by, for example, laser welding. The base plate 105 is fixed to a contact face of a carriage arm 107.

FIG. 14 is an enlarged sectional view partly showing the base plate 105 attached to the carriage arm 107. The base plate 105 has a flange 109 and a boss 111. The flange 109 has a contact face 113 attached to the contact face 115 of the carriage arm 107. The boss 111 is inserted into a hole 117 of the carriage arm 107 and is plastically deformed therein, to attach the head suspension to the carriage arm 107. The plastic deformation of the boss 111 is carried out by, for example, passing a steel ball through a hole 119 of the boss 111. The steel ball expands the hole 119 and presses a peripheral face 121 of the boss 111 to the hole 117 of the carriage arm 107, thereby fixing the head suspension to the carriage arm 107.

Flatness of the flange 109 of the base plate 105 greatly influences contact between the carriage-arm contact face 115 and the base-plate contact face 113. It also influences fixation achieved by the plastic deformation of the boss 111.

The flange 109 must be thin to reduce the weight of the head suspension, and the boss 111 must have a sufficient thickness to secure strength. Pressing a plate material having a predetermined thickness into a base plate may provide the base plate with a sufficiently thin flange and a sufficiently thick boss.

Simply pressing a plate material into a base plate with a thin flange, however, leaves a fillet along a corner 123 between the flange 109 and the boss 111. The fillet interferes with a corner 125 of the carriage arm 107, to float or incline the flange 109 relative to the carriage-arm contact face 115. Then, even if the flange 109 is sufficiently thin and flat, the base plate 105 will improperly be fixed to the carriage arm 107 with the plastic deformation of the boss 111.

If the fixation of the base plate 105 to the carriage arm 107 is improper, the tightening torque of the base palate 105 relative to the carriage arm 107 will be insufficient and the insufficient tightening torque will destabilize the fitting of the head suspension to the carriage arm 107.

SUMMARY OF THE INVENTION

An object of the present invention is to provide a head suspension for a disk drive, having a thin flange and capable of properly fitting to a carriage arm of the disk drive.

A first aspect of the present invention provides a head suspension for a disk drive, including a base plate, a load beam, and a recess. The base plate has a flange and a boss. The flange has a contact face to be attached to a contact face of a carriage arm of the disk drive. The boss is inserted into a hole of the carriage arm and is plastically deformed therein to fix the base plate to the carriage arm. The load beam has a rigid part and a resilient part and supported by the base plate, to apply load on a slider arranged at a front end of the load beam. The recess is formed on the base plate along a corner between the flange and the boss, to secure a gap relative to the carriage arm.

For the head suspension of the first aspect, a second aspect of the present invention radially expands the recess on the flange to narrow the contact face of the flange toward the outer periphery of the flange.

For the head suspension of the second aspect, a third aspect of the present invention sets the ratio of a width of the flange to a width of the contact face of the flange to 7 to 2.

For the head suspension of any one of the first to third aspects, a fourth aspect of the present invention provides the recess with a slope rising from the boss to the contact face of the flange.

The first aspect attaches the base plate to a carriage arm by inserting the boss into a hole of the carriage arm and by plastically deforming the boss therein. The load beam having the rigid part and resilient part is supported by the base plate and applies load on the slider arranged at a front end of the load beam.

The contact face of the flange of the base plate is attached to a contact face of the carriage arm. The boss of the base plate is inserted into the hole of the carriage arm and is plastically deformed therein to fix the base plate to the carriage arm. The recess formed on the base plate along the corner between the flange and the boss secures a gap relative to the carriage arm. The base plate may be formed by pressing a plate material having a predetermined thickness, to provide the flange with thinness and flatness. Even with the thin flange, the recess secures a gap between the carriage arm and the corner of the boss and flange, to surely attach the flange to the contact face of the carriage arm.

The first aspect is capable of tightly attaching the contact face of the flange to the contact face of the carriage arm and preventing the flange from inclining to the contact face of the carriage arm. This results in improving the attaching accuracy and strength of the base plate to the carriage arm when the boss is plastically deformed.

In addition to the effects of the first aspect, the second aspect radially expands the recess on the flange to narrow the contact face of the flange toward the outer periphery of the flange. The second aspect enlarges the radius of the contact face of the flange and reduces the area of the contact face of the flange attached to the contact face of the carriage arm.

The second aspect secures flatness of the contact face of the flange and improves the attaching accuracy of the flange to the contact face of the carriage arm. The enlarged radius of the contact face of the flange stabilizes the attachment of the flange to the carriage arm. This results in totally improving the attaching accuracy and strength of the base plate to the carriage arm.

In addition to the effects of the second aspect, the third aspect sets the ratio of a width of the flange to a width of the contact face of the flange to 7 to 2. This results in reducing the area of the contact face of the flange, improving flatness of the contact face of the flange, and enlarging the radius of the contact face of the flange, thereby improving the attaching accuracy and strength of the base plate to the carriage arm.

In addition to the effects of any one of the first to third aspects, the fourth aspect provides the recess with a slope rising from the boss to the contact face of the flange. This results in gradually changing the thickness of the flange from the boss to the contact face of the flange, securing the rigidity of the flange even with the recess, and improving the attaching accuracy and strength of the base plate to the carriage arm.

DETAILED DESCRIPTION OF EMBODIMENTS (First Embodiment)

Figure 1:
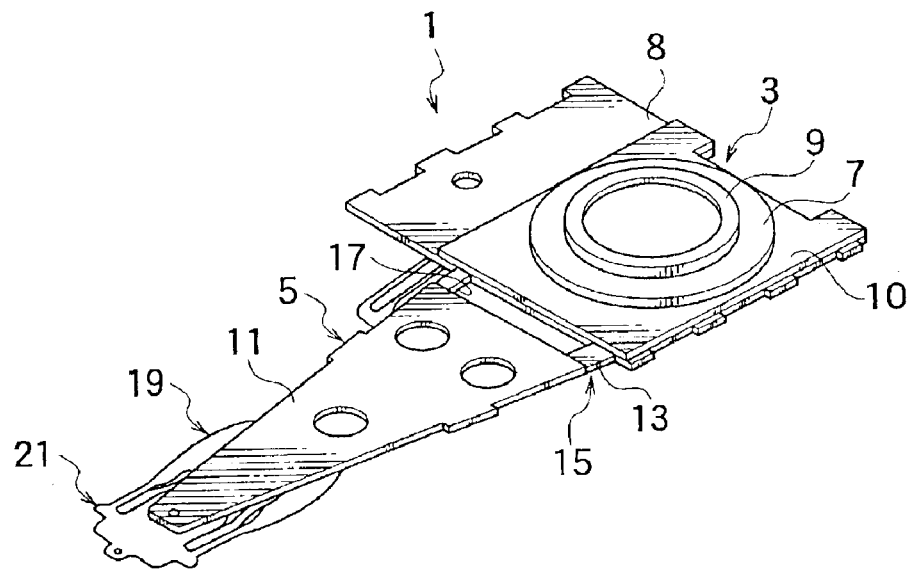
FIG. 1 is a perspective view showing a head suspension according to a first embodiment of the present invention.
Figure 13:
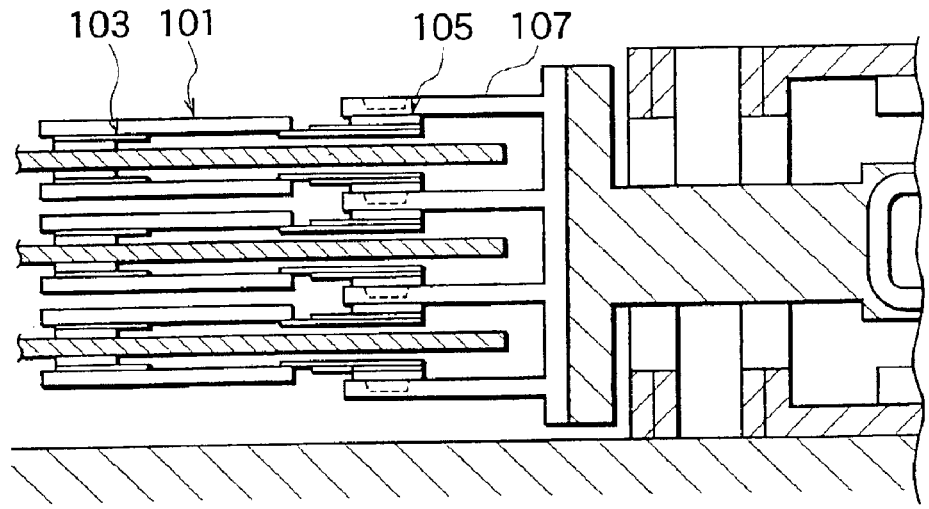
FIG. 13 is a partly broken side view showing a hard disk drive employing head suspensions according to a related art.
Figure 14:
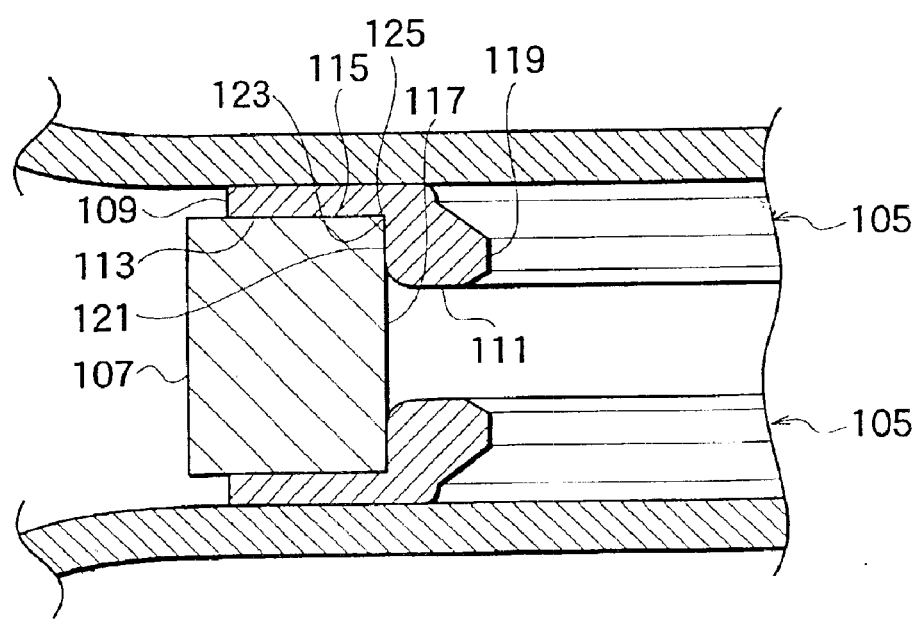
FIG. 14 is an enlarged sectional view partly showing the head suspension of the related art attached to a carriage arm.

FIG. 1 is a perspective view showing a head suspension 1 for a disk drive, according to the first embodiment of the present invention. The head suspension 1 is attached to a carriage arm like the one shown in FIG. 13. The head suspension 1 has a base plate 3 and a load beam 5.

The base plate 3 is made of, for example, stainless steel and has a flange 7 and a boss 9. The flange 7 is circular in a plan view. The boss 9 protrudes from the flange 7. The base plate 3 is attached to a carriage arm by fitting the boss 9 into a hole of the carriage arm and by plastically deforming the boss 9 therein.

The base plate 3 is fixed to a reinforcing plate 8 by welding (such as laser welding) or bonding through a plate 10. The reinforcing plate 8 and the plate 10 are made of, for example, stainless steel.

The load beam 5 includes a rigid part 11 and a resilient part 13. The load beam 5 is supported by the base plate 3 and applies load on a slider arranged at a front end of the load beam 5.

The resilient part 13 is made of a resilient material 15 that is independent of the rigid part 11. The rigid part 11 is made of, for example, stainless steel. The rigid part 11 may be made of an alloy of light metal (metal lighter than Fe) such as aluminum (Al) and titanium (Ti), or synthetic resin, to simultaneously realize lightness and rigidity for the head suspension 1. The rigid part 11 may be made of a composite material (clad material) consisting of two or more layers of light metal such as aluminum and titanium or an alloy of light metal and other metal such as stainless steel.

An end of the resilient material 15 is joined to the reinforcing plate 8 integrally, and another end thereof is fixed to an end of the rigid part 11 by welding (such as laser welding) or bonding. An end of the resilient material 15 may be joined to the plate 10 integrally, and the reinforcing plate 8 may be omitted. The resilient material 15 is made of, for example, a resilient thin stainless steel plate having a precise low spring constant lower than that of the rigid part 11. The resilient material 15 has an opening 17 formed by etching or precision pressing. The opening 17 partly reduces the bending rigidity (bending constant) of the resilient material 15, to form the resilient part 13 serving as a hinge between the two ends of the resilient material 15.

The rigid part 11 has a flexure 19. The flexure 19 consists of a metal base made of, for example, a resilient thin stainless steel rolled plate, an insulating layer formed on the metal base, and a conductive path formed in the insulating layer. An end of the conductive path is connected to a terminal on a head 21 arranged at a front end of the rigid part 11. Another end of the conductive path is connected to a terminal on the reinforcing plate 8. The flexure 19 is fixed to the rigid part 11 by welding (such as laser welding) or bonding.

Figure 2:
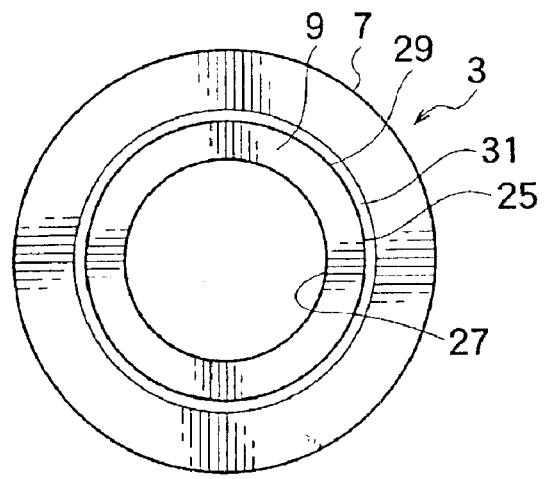
FIG. 2 is a plan view showing a base plate of the head suspension of FIG. 1.
Figure 3:
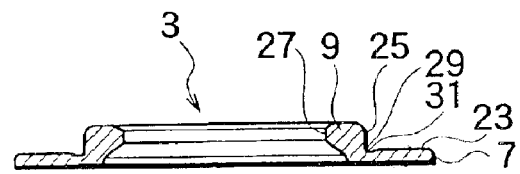
FIG. 3 is a sectional view showing the base plate of FIG. 2.
Figure 4:
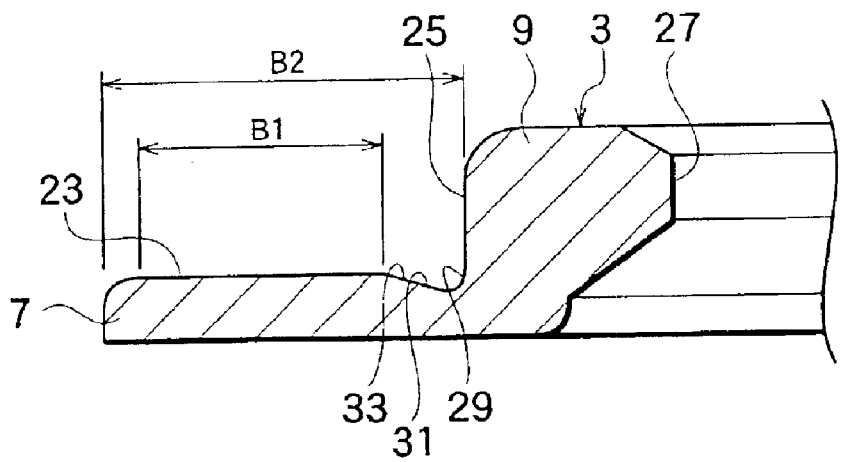
FIG. 4 is an enlarged sectional view partly showing the base plate of FIG. 3.

FIG. 2 is a plan view showing the base plate 3, FIG. 3 is a sectional view showing the same, and FIG. 4 is an enlarged sectional view partly showing the same. The base plate 3 has the flange 7 and boss 9. The base plate 3 is formed by pressing a plate material having a predetermined thickness, to provide the flange 7 with thinness. Namely, the flange 7 is sufficiently thin, and the boss 9 is sufficiently thick.

The flange 7 has a contact face 23 attached to a contact face of a carriage arm. To reduce weight, the flange 7 is made as thin as possible.

The boss 9 is cylindrical and protrudes from the flange 7. The height of the boss 9 is greater than the thickness of the flange 7, to secure a sufficient fitting margin for the boss 9.

The boss has a peripheral face 25 and a ball pass hole 27. A steel ball is passed through the hole 27, to expand the hole 27 and radially deform the boss 9.

According to the embodiment, a recess 31 is formed on the base plate 3 along a corner 29 between the boss 9 and the flange 7. The recess 31 secures a gap along the corner 29 with respect to a contact face of a carriage arm when the base plate 3 is attached to the carriage arm. The recess 31 involves a slope 33 rising from the boss 9 to the contact face 23. Along the slope 33, the thickness of the flange 7 gradually increases from the boss 9 to the contact face 23. This configuration secures the rigidity of the base plate 3 even with the recess 31.

In FIG. 4, a width B2 of the flange 7 with the recess 31 is 0.7 mm and a width B1 of the contact face 23 is 0.6 mm. Namely, B2:B1=7:6.

When producing the base plate 3, the recess 31 and slope 33 are simultaneously formed by pressing. Of the base plate 3 with the recess 31 and slope 33, the flange 7 is sufficiently thin and the boss 9 is sufficiently thick. The recess 31 and slope 33 may be formed by etching.

Figure 5:
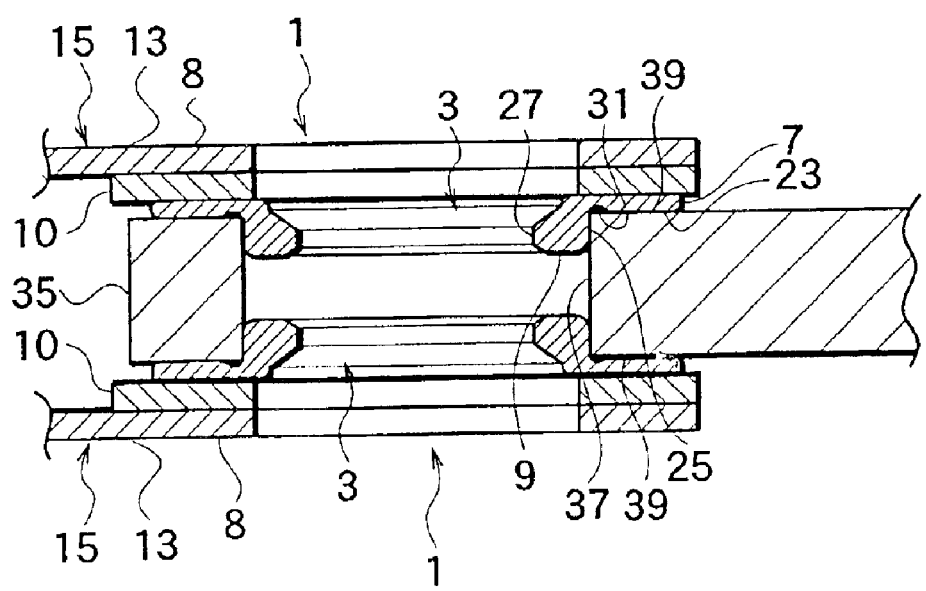
FIG. 5 is a sectional view partly showing the head suspension of FIG. 1 attached to a carriage arm.
Figure 6:
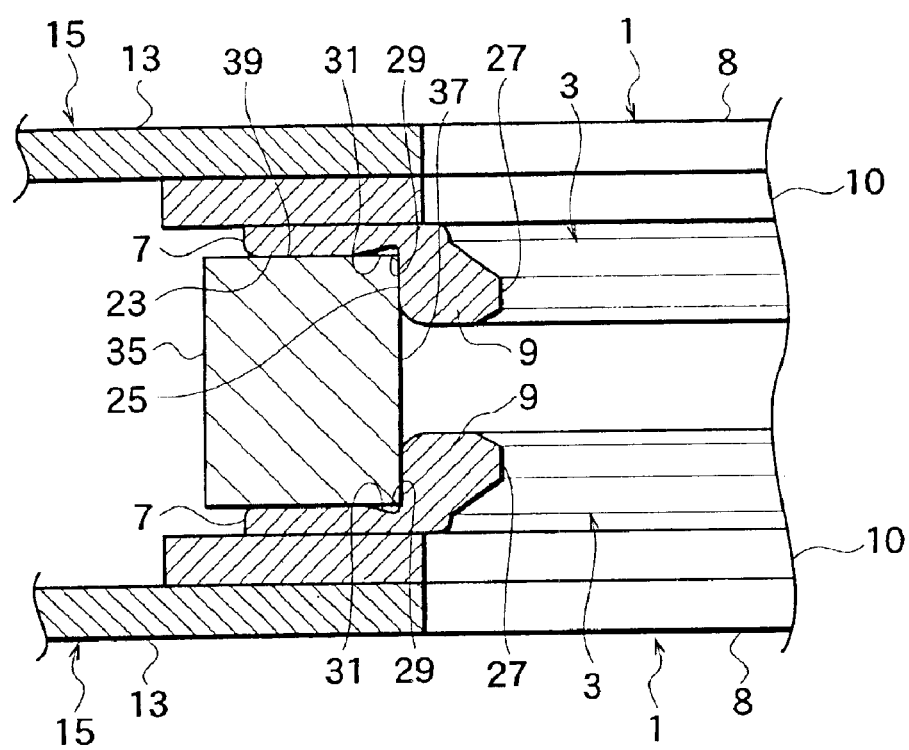
FIG. 6 is an enlarged sectional view partly showing the head suspension and carriage arm of FIG. 5.

The head suspension 1 is attached to a carriage arm 35 of a disk drive as shown in FIGS. 5 and 6 in which FIG. 5 is a sectional view partly showing the head suspension 1 attached to the carriage arm 35 and FIG. 6 is an enlarged sectional view partly showing the head suspension 1 and carriage arm 35.

The carriage arm 35 is rotated by a positioning motor such as a voice coil motor. The carriage arm 35 has a hole 37 and a contact face 39. The contact face 23 of the flange 7 of the base plate 3 is attached to the contact face 39 of the carriage arm 35, and the boss 9 is inserted into the hole 37 and is plastically deformed therein to fix the head suspension 1 to the carriage arm 35.

Under the state of FIGS. 5 and 6, the head suspension 1 is held to the carriage arm 35 with a jig, and a steel ball is passed through the hole 27 of the boss 9. The steel ball expands the hole 27 and radially deforms the boss 9 to press the peripheral face 25 of the boss 9 to the hole 37 of the carriage arm 35. As a result, the base plate 3 is fixed to the carriage arm 35. Namely, the head suspension 1 is fixed to the carriage arm 35. At this time, the flat contact face 23 of the flange 7 is precisely made in contact with the contact face 39 of the carriage arm 35, to improve the attaching accuracy of the base plate 3 to the carriage arm 35.

The recess 31 according to the first embodiment secures a gap between the corner 29 of the base plate 3 and the carriage arm 35. As a result, the corner 29 never interferes with a corner between the hole 37 and contact face 39 of the carriage arm 35. Consequently, the contact face 23 of the base plate 3 correctly attaches to the contact face 39 of the carriage arm 35.

Under this correct contact state, the boss 9 is radially deformed and fixed to the hole 37, to surely improve the attaching strength of the base plate 3 to the carriage arm 35. This maintains high tightening torque of the base plate 3 in a rotational direction relative to the carriage arm 35 and improves the attaching strength of the head suspension 1 to the carriage arm 35.

Figure 7:
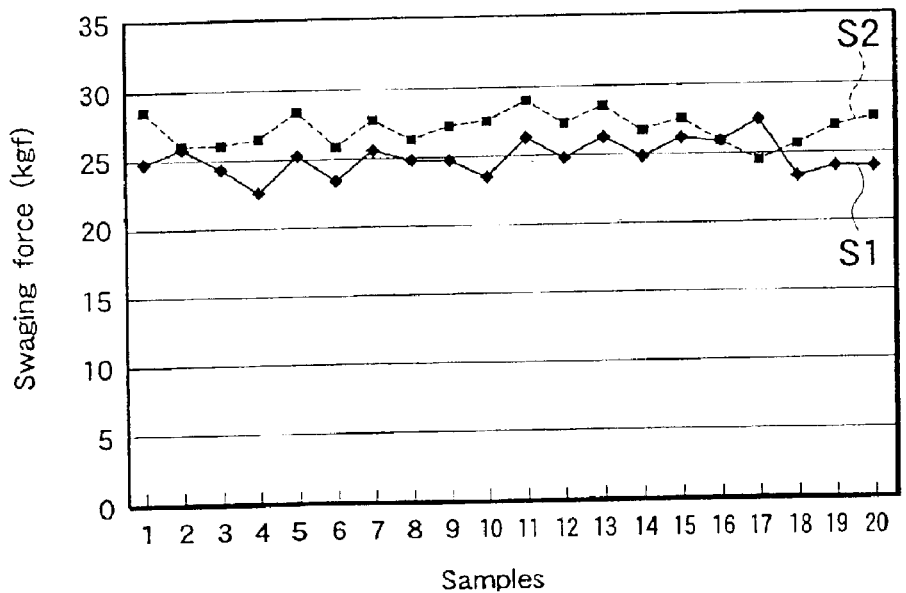
FIG. 7 is a graph showing swaging force applied to base plate samples prepared according to embodiments of the present invention.
Figure 8:
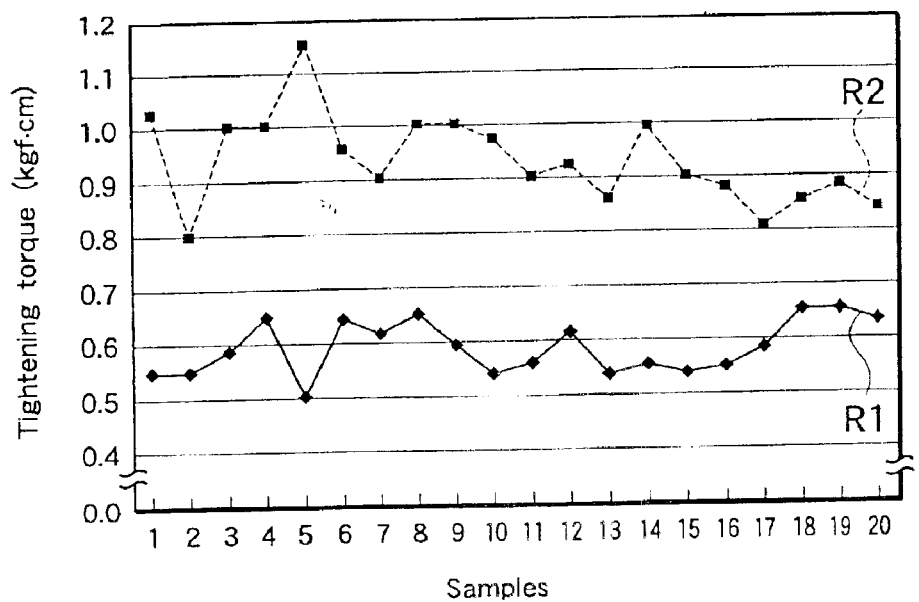
FIG. 8 is a graph showing tightening torque of the base plate samples.

FIGS. 7 and 8 are graphs showing the effects of the first and second embodiments of the present invention in which FIG. 7 shows swaging force applied when plastically deforming bosses of base plate samples and FIG. 8 shows tightening torque of the base plate samples relative to carriage arms. The number of the base plate samples in FIGS. 7 and 8 is 20.

A curve S1 of FIG. 7 represents swaging force applied to the base plate samples prepared according to the first embodiment of the present invention. The curve S1 is stable in a range of 2.3 kgf to 2.7 kgf. As a result, swaging work to plastically deform the bosses of the samples can properly be carried out. A curve R1 of FIG. 8 shows tightening torque of the same samples relative to carriage arms. The curve R1 is high and stable in a range of 0.5 kgfcm to 0.65 kgfcm.

On the other hand, base plate samples prepared according to the prior art having no recess between a boss and a flange, or no recess and slope between a boss and a flange show unstable swaging force that varies from sample to sample. Also, the prior art samples show a tightening torque curve lower than the curve R1 of FIG. 8 and varying from sample to sample.

Providing a base plate with the recess 31 or with the recess 31 and slope 33 is effective to improve the attaching accuracy and strength of the base plate to the carriage arm 35.

(Second Embodiment)

Figure 9:
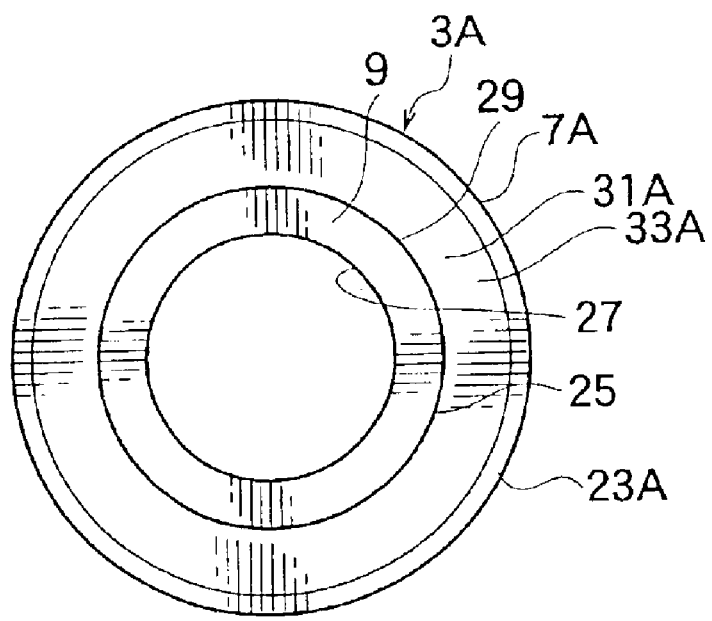
FIG. 9 is a plan view showing a base plate of a head suspension according to a second embodiment of the present invention.
Figure 10:
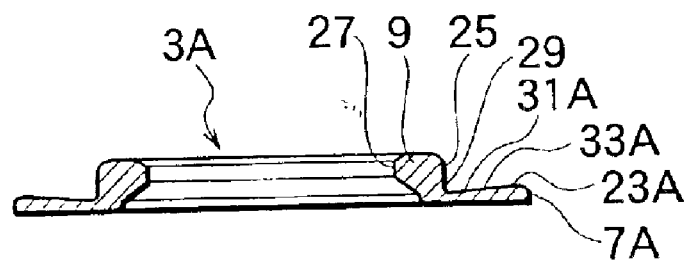
FIG. 10 is a sectional view showing the base plate of FIG. 9.
Figure 11:
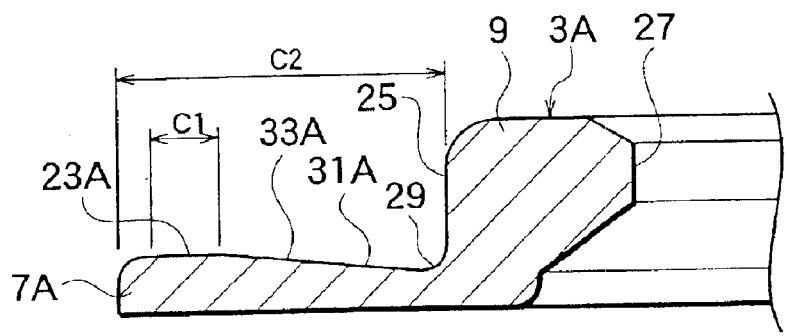
FIG. 11 is an enlarged sectional view partly showing the base plate of FIG. 10.
Figure 12:
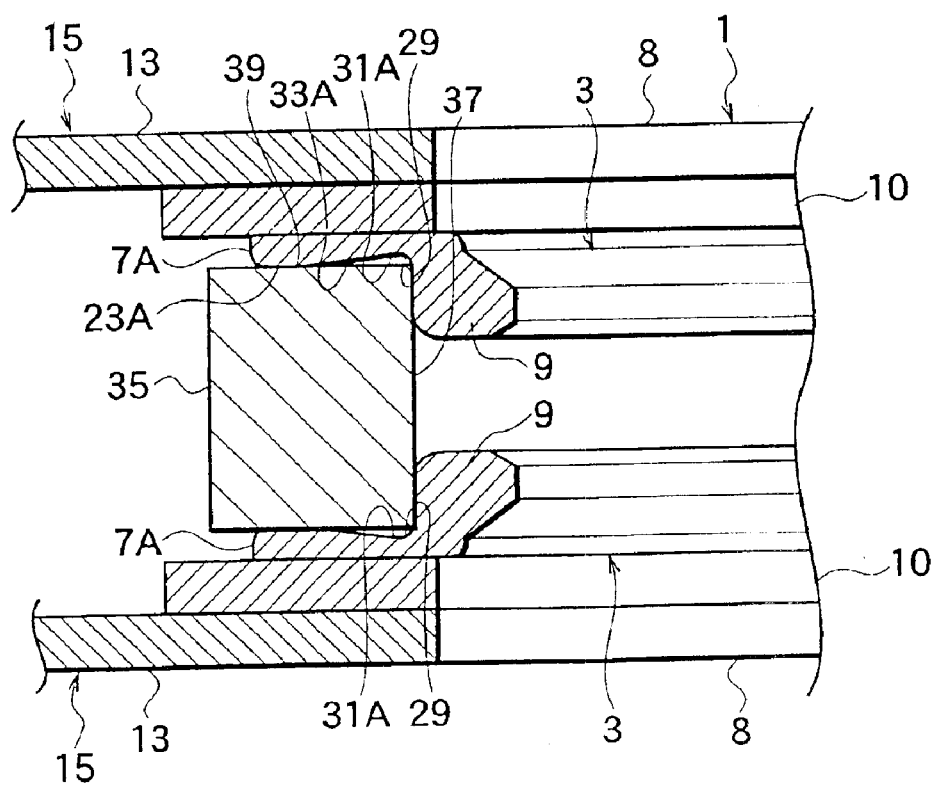
FIG. 12 is an enlarged sectional view partly showing the head suspension attached to a carriage arm, according to the second embodiment.

FIGS. 9 to 12 show a base plate of a head suspension according to the second embodiment of the present invention, in which FIG. 9 is a plan view showing the base plate, FIG. 10 is a sectional view showing the same, FIG. 11 is an enlarged sectional view partly showing the same, and FIG. 12 is an enlarged sectional view partly showing the head suspension attached to a carriage arm. The structure of the second embodiment is basically the same as that of the first embodiment, and therefore, like parts are represented with like reference numerals.

The base plate 3A has a boss 9, a flange 7A, and a recess 31A. The recess 31A runs along a corner between the boss 9 and the flange 7A, to secure a gap relative to the carriage arm 35. The base plate 3A is formed by pressing like the first embodiment.

The recess 31A is radially wider than the recess 31 of the first embodiment. As a result, a contact face 23A of the flange 7A is narrow and close to the outer periphery of the flange 7A. According to the second embodiment, a width C2 of the flange 7A is 0.7 mm and a width C1 of the contact face 23A is 0.2 mm. Namely, C2:C1=7:2.

This configuration reduces the area of the contact face 23A and improves the flatness thereof. A radius at the widthwise center of the contact face 23A is called a contact radius of the contact face 23A. This contact radius is greater than that of the first embodiment. Namely, the contact radius of the contact face 23A is closer to the outer periphery of the flange 7A than that of the first embodiment.

According to the second embodiment, the inclination angle of a slope 33A rising from the boss 9 to the contact face 23A is small to gradually change the thickness of the flange 7A from the boss 9 to the contact face 23A. This configuration secures the rigidity of the flange 7A.

The base plate 3A is attached to the carriage arm 35 as shown in FIG. 12.

In FIG. 12, the area of the contact face 23A of the base plate 3A is small on the contact face 39 of the carriage arm 35, and therefore, the contact face 23A surely secures flatness to improve the attaching accuracy of the contact face 23A to the contact face 39. The contact radius of the contact face 23A on the contact face 39 is close to the outer periphery of the flange 7A, to improve and stabilize the attaching accuracy of the flange 7A to the contact face 39.

The slope 33A gradually changes the thickness of the flange 7A, to maintain the rigidity of the flange 7A and correctly attach the flat contact face 23A to the contact face 39.

Under this state, the boss 9 in the hole 37 of the carriage arm 35 is swaged and deformed to fix the base plate 3A to the carriage arm 35. This improves the attaching strength of the base plate 3A to the carriage arm 35.

A curve S2 of FIG. 7 represents swaging force applied to base plate samples prepared according to the second embodiment, and a curve R2 of FIG. 8 represents tightening torque of the same samples relative to carriage arms. The curve S2 of FIG. 7 shows that the second embodiment is capable of maintaining high swaging force without variations among the samples. The curve R2 of FIG. 8 shows that the second embodiment samples are capable of stably maintaining high tightening force. The second embodiment, therefore, is capable of improving the attaching accuracy and strength of the head suspension 1 to the carriage arm 35.

The contact face 23A of the flange 7 may be closer to the outer periphery of the flange 7A, to reduce the area thereof and enlarge the contact radius thereof. The ratio of the width of the flange 7A to the width of the contact face 23A is optional. For example, it may be 2:1, or 5:3.

What is claimed is:

1. A head suspension for a disk drive to be attached to a contact face of a carriage arm of the disk drive, comprising:
    a base plate having a flange and a boss, the flange having a contact face to be attached to the contact face of the carriage arm of the disk drive, the boss being inserted into a hole of the carriage arm and plastically deformed therein to fix the base plate to the carriage arm;
    a load beam having a rigid part and a resilient part, supported by the base plate, to apply load on a slider arranged at a front end of the load beam;
    a recess formed on the base plate along a junction of the flange and the boss and between the contact face and the boss, to secure a gap relative to the carriage arm; and
    a ratio of a radial width of the flange to a radial width of the contact face being 7 to 6.

2. The head suspension of claim 1, wherein the recess has a slope rising from the boss to the contact face of the flange.

3. The head suspension of claim 2, wherein the slope of the recess includes a linear portion rising to the contact face of the flange.

4. A head suspension to be attached to a contact face of a carriage arm of the disk drive, comprising:
    a base plate having a flange and a boss, the flange having a contact face to be attached to the contact face of the carriage arm of the disk drive, the boss being inserted into a hole of the carriage arm and plastically deformed therein to fix the base plate to the carriage arm;
    a load beam having a rigid part and a resilient part, supported by the base plate, to apply load on a slider arranged at a front end of the load beam;
    a recess formed on the base plate along a junction of the flange and the boss and between the contact face and the boss, to secure a gap relative to the carriage arm; and
    the recess is radially disposed on the flange, to narrow the contact face of the flange toward the outer periphery of the flange such that a ratio of a width of the flange to a width of the contact face of the flange is greater than 7 to 6.

5. The head suspension of claim 4, wherein the recess has a slope rising from the boss to the contact face of the flange.

6. The head suspension of claim 2, wherein the slope of the recess includes a linear portion rising to the contact face of the flange.

7. The head suspension of claim 4, wherein the ratio of the width of the flange to the width of the contact face of the flange is 5 to 3.

8. The head suspension of claim 4, wherein the ratio of the width of the flange to the width of the contact face of the flange is 2 to 1.

9. A head suspension to be attached to a contact face of a carriage arm of the disk drive, comprising:
    a base plate having a flange and a boss, the flange having a contact face to be attached to the contact face of the carriage arm of the disk drive, the boss being inserted into a hole of the carriage arm and plastically deformed therein to fix the base plate to the carriage arm;
    a load beam having a rigid part and a resilient part, supported by the base plate, to apply load on a slider arranged at a front end of the load beam;
    a recess formed on the base plate along a junction of the flange and the boss and between the contact face and the boss, to secure a gap relative to the carriage arm; and
    a ratio of a width of the flange to a width of the contact fare of the flange being 7 to 2.

10. The head suspension of claim 9, wherein the recess has a slope rising from the boss to the contact face of the flange.

11. The head suspension of claim 10, wherein the slope of the recess includes a linear portion rising to the contact face of the flange.

* * * * *